US008135869B2

(12) United States Patent
Chang et al.

(10) Patent No.: US 8,135,869 B2
(45) Date of Patent: Mar. 13, 2012

(54) TASK SCHEDULING TO DEVICES WITH SAME CONNECTION ADDRESS

(75) Inventors: Naichih Chang, Shrewsbury, MA (US); Victor Lau, Marlboro, MA (US); Pak-lung Seto, Shrewsbury, MA (US); William Halleck, Lancaster, MA (US)

(73) Assignee: Intel Corporation, Santa Clara, CA (US)

( * ) Notice: Subject to any disclaimer, the term of this patent is extended or adjusted under 35 U.S.C. 154(b) by 1687 days.

(21) Appl. No.: 11/172,776

(22) Filed: Jun. 30, 2005

(65) Prior Publication Data

US 2007/0006235 A1    Jan. 4, 2007

(51) Int. Cl.
G06F 15/16 (2006.01)
H04B 1/56 (2006.01)
(52) U.S. Cl. ........................................ 709/250; 370/276
(58) Field of Classification Search .......... 709/227–230, 709/250
See application file for complete search history.

(56) References Cited

U.S. PATENT DOCUMENTS

| | | | |
|---|---|---|---|
| 5,392,280 A | 2/1995 | Zheng | |
| 5,802,340 A | 9/1998 | Mallick et al. | |
| 5,862,406 A | 1/1999 | Matsumoto et al. | |
| 6,493,739 B1 | 12/2002 | Dolin, Jr. et al. | |
| 6,790,075 B1 | 9/2004 | Sung | |
| 6,843,674 B1 | 1/2005 | Young | |
| 6,917,992 B2 | 7/2005 | Grimsrud et al. | |
| 7,093,033 B2 | 8/2006 | Beckett et al. | |
| 2003/0021239 A1 | 1/2003 | Mullendore et al. | |
| 2004/0073719 A1 | 4/2004 | Grimsrud et al. | |
| 2004/0252716 A1 | 12/2004 | Nemazie | |
| 2005/0015532 A1 | 1/2005 | Beckett et al. | |
| 2005/0138191 A1 | 6/2005 | Seto et al. | |
| 2005/0138202 A1 | 6/2005 | Seto | |
| 2005/0149656 A1 | 7/2005 | Seto | |
| 2006/0004935 A1 | 1/2006 | Seto et al. | |
| 2006/0041691 A1 | 2/2006 | Bashford et al. | |
| 2006/0064568 A1 | 3/2006 | Seto et al. | |
| 2006/0294286 A1 | 12/2006 | Duerck et al. | |
| 2007/0002827 A1 | 1/2007 | Lau et al. | |
| 2007/0005838 A1 | 1/2007 | Chang et al. | |
| 2007/0005850 A1 | 1/2007 | Chang et al. | |
| 2007/0005896 A1 | 1/2007 | Chang et al. | |

(Continued)

FOREIGN PATENT DOCUMENTS

TW         200421883         10/2004

(Continued)

OTHER PUBLICATIONS

APT Technologies, Inc., et al., "Serial ATA: High Speed Serialized AT Attachment", *Revision 1.0a*, (Jan. 7, 2003),1-2, 184-236.

(Continued)

*Primary Examiner* — Ian N Moore
*Assistant Examiner* — Afshawn Towfighi
(74) *Attorney, Agent, or Firm* — Blakely, Sokoloff, Taylor & Zafman LLP

(57) ABSTRACT

Methods of scheduling tasks in computer systems architectures are disclosed. In one aspect, a method may include comparing a connection address of a first node with a connection address of a second node, determining that the connection address of the first node matches the connection address of the second node, and scheduling tasks to the first and second nodes based, at least in part, on the determination. Apparatus to implement task scheduling, and systems including the apparatus are also disclosed.

11 Claims, 9 Drawing Sheets

U.S. PATENT DOCUMENTS

| | | | |
|---|---|---|---|
| 2007/0006235 | A1 | 1/2007 | Chang et al. |
| 2007/0011333 | A1 | 1/2007 | Lau et al. |
| 2007/0011360 | A1 | 1/2007 | Chang et al. |
| 2007/0067504 | A1 | 3/2007 | Lau et al. |

FOREIGN PATENT DOCUMENTS

| | | |
|---|---|---|
| TW | 200421883 A | 10/2004 |

OTHER PUBLICATIONS

Dell Computer Corporation, et al., "Serial ATA II: Extensions to Serial ATA 1.0a", *Revision 1.2*, (Aug. 27, 2004),24-52.

Dell Computer Corporation, et al., "Serial ATA II: Extensions to Serial ATA 1.0a", *Revision 1.2*, (Aug. 27, 2005),103-106.

Grimsrud, Knut, et al., "Serial ATA Storage Architecture and Applications (Designing High-Performance, Low-Cost I/O Solutions)", *Intel Press*, ISBN 0-9717861-8-6, (2003),Entire Book.

Intel Corporation, "Comparing Serial ATA Native Command Queing (NCQ) and ATA Tagged Command Queuing (TCQ)", *The Advantage of Serial ATA Native Command Queuing*, (Oct. 2003),1-4.

SATA-IO Board Members, et al., "Serial ATA International Organization: Port Multiplier", *Revision 1.2*, (Jan. 27, 2005),1-38.

PCT Search Report for PCT/US2006/025753.

"PCT/US2006/025461 Search Report", 1 page.

"PCT/US2006/025462 Search Report", (Nov. 14, 2006),2 pages.

"PCT/US2006/025750 Search Report", (Apr. 23, 2007),2 pages.

Dell Computer Corporation, et al., "Serial ATA II: Extensions to Serial ATA 1.0a", *Serial ATA Extensions Workgroup*, XP-002414889, (Aug. 27, 2004),pp. 22-32.

Intel Corporation, "Serial ATA II Native Command Queuing Overview, Application Note", www.intel.com/design/storage/papers/252664.htm, retrieved on Nov. 28, 2006,(Apr. 30, 2004),the whole document.

Intel Corporation, et al., "Serial ATA Native Command Queuing", XP-002428259, Joint Whitepaper by Intel Corporation & Seagate Technology,(Jul. 2003),the whole document (12 pages).

LSI Logic Corporation, "LSISAS1064 4-Port 3Gbit/s Serial Attached SCSI Controller", Data Sheet, XP002404785 USA, www.lsi.com/files/docs/techdocs/storage_stand_prod/sas/1064.ds.pdf, (Mar. 29, 2005),pp. 1-30.

LSI Logic Corporation, "LSISASx12 3.0 Gbits/s Serial Attached SCSI Expander", *Data Sheet, XP002404784 USA*, www.lsilogic.com/files/docs/techdocs/storage_stand_prod/sas/sasx12_ds.pdf, (Feb. 3, 2005),pp. 1-26.

"Office Action for Taiwan Patent Application No. 95123613", (Oct. 19, 2009), Whole Document.

"Office Action with English Translation for German Patent Application No. 11 2006 001 345.9-53", (Apr. 3, 2009), Whole Document.

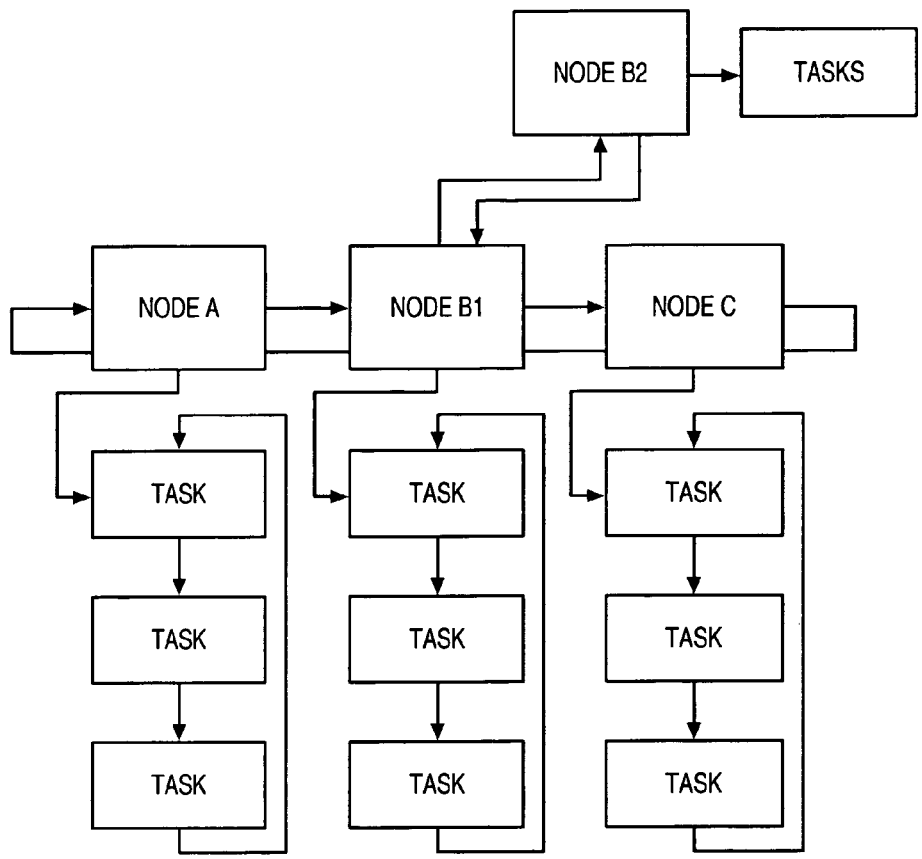
FIG. 5A
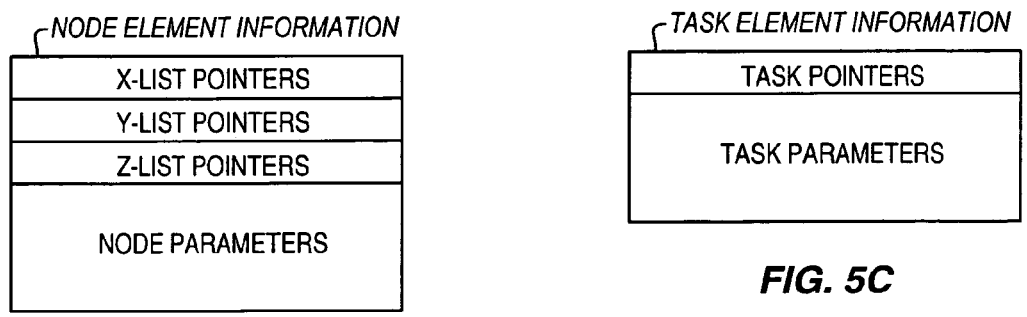
FIG. 5B
FIG. 5C

TASK SCHEDULING TO DEVICES WITH SAME CONNECTION ADDRESS

BACKGROUND

1. Field

Embodiments of the invention relate to the field of computing systems architecture. More specifically, embodiments of the invention relate to the field of task scheduling in a computing systems architecture.

2. Background Information

Various storage systems and architectures are known in the arts. Representatively, certain large Serial Attached SCSI (SAS) storage systems may include hundreds of storage devices that are attached to the same SAS domain through expanders, Serial Advanced Technology Attachment (SATA) port multipliers, and the like. SAS is described, for example, in the document Serial Attached SCSI specification 1.0, published November 2003, as well as related documents. SATA is described, for example, in the document "Serial ATA: High Speed Serialized AT Attachment", Revision 1.0a, published on 7 Jan. 2003, as well as related documents.

Task scheduling is typically performed in such storage systems to schedule tasks to the attached storage devices. Depending in part on the particular architecture, representative tasks that may be scheduled include commands, frames, data, primitives, and the like.

Especially in large storage networks, such task scheduling may significantly affect overall performance. Scheduling tasks in an efficient manner may allow data to be exchanged in the storage system in an efficient manner, while scheduling tasks in an inefficient manner may incur unnecessary inefficiencies, such as, for example, unnecessary closures and re-openings of connections to attached storage devices, which may reduce the overall data exchange performance.

However, efficiently scheduling tasks in storage systems, especially large storage systems, remains challenging.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 5A shows a task scheduling data structure, according to one or more embodiments of the invention.

FIG. 5B shows node element information for a task scheduling data structure, according to one or more embodiments of the invention.

FIG. 5C shows task element information for a task scheduling data structure, according to one or more embodiments of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
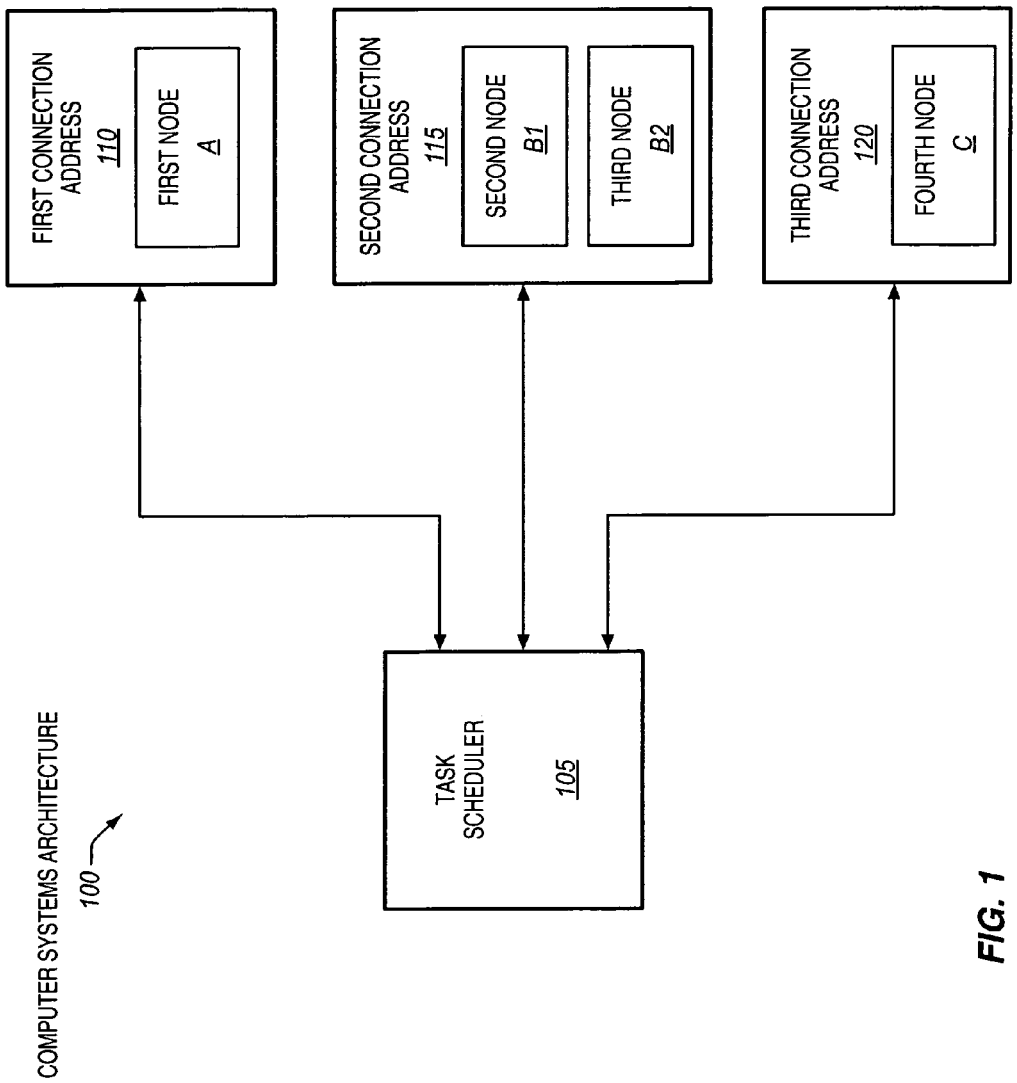
FIG. 1 is a block diagram showing a computer systems architecture including a task scheduler that may be used to schedule tasks for nodes having the same and different connection addresses, according to one or more embodiments of the invention.

FIG. 1 is a block diagram showing a computer systems architecture 100, according to one or more embodiments of the invention. The illustrated computer systems architecture includes a task scheduler 105, a first node (A) that may be accessed through a first connection address 110, a second node (B1) and a third node (B2) that may both be accessed through a second connection address 115, and a fourth node (C) that may be accessed through a third connection address 120.

The first node may be coupled with, or otherwise in communication with, the task scheduler by a first communication path to or through the first connection address. The second node (B1) and third node (B2) may each be coupled with, or otherwise in communication with, the task scheduler by a second communication path to or through the second connection address. The fourth node (C) may be coupled with, or otherwise in communication with, the task scheduler by a third communication path to or through the third connection address.

The task scheduler may schedule tasks for the nodes. Typically, the task scheduler may cycle through the different nodes in an order or sequence that is prescribed by an algorithm, although the scope of the invention is not limited in this respect. Representative algorithms that may potentially be used by the task scheduler include, but are not limited to, round robin, weighted round robin, fixed priority, and other algorithms known in the arts. The scope of the invention is not limited to any particular algorithm.

Since some nodes, such as, for example, nodes B1 and B2, may share the same connection address, the order in which the nodes are traversed during task scheduling, may significantly affect performance. For instance, if nodes having a common connection address are interleaved with a node having a different connection address, then unnecessary closings and openings of connections to the nodes may result. Consider, for instance, traversal of the nodes in the order B1, then C, and then B2. Notice that in this traversal nodes B1 and B2, which have a common connection address, are interleaved with node C, which has a different connection address. Such a situation may result in an unnecessary closure of the connection to the connection address of nodes B1 after scheduling tasks to B1, and an unnecessary re-opening of the connection to the connection address B2 (which is the same as the connection address of node B1) after scheduling tasks for C and before scheduling tasks to B2. Such unnecessary closures and openings of connections may add unnecessary connection overhead and may adversely affect performance.

Such unnecessary closures and openings of connections are not required, and may be eliminated, or at least reduced, according to various embodiments of the present invention. In one or more embodiments of the invention, tasks may be scheduled to nodes that have the same or matching connection address during a single common connection to the connection address. In one or more not necessarily different embodiments of the invention, tasks for nodes with the same connection address may be scheduled consecutively rather than interleaving them with tasks that are scheduled for one or more nodes with one or more different connection addresses.

Figure 2:
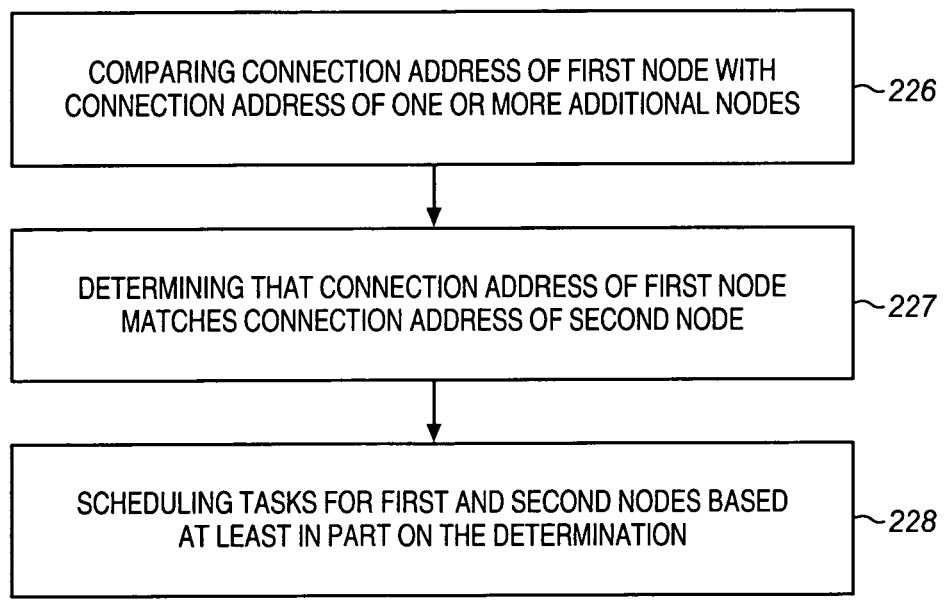
FIG. 2 is a flow diagram of a method of scheduling tasks to nodes, according to one or more embodiments of the invention.

FIG. 2 is a flow diagram of a method 225 of scheduling tasks to nodes, according to one or more embodiments of the invention. The method may be implemented by logic including hardware, software, or a combination of hardware and software.

Initially, the task scheduler may compare a connection address of a first node with connection addresses of one or more additional nodes, at block 226. As used herein, the term "connection address" is used broadly to refer to information indicating an address or other point at which a node may be accessed. One specific example of a suitable connection address is an SAS address. Other examples of suitable connection addresses will be disclosed further below.

In one or more embodiments of the invention, the task scheduler may perform the comparison during a setup or initialization procedure before scheduling tasks to nodes. In addition, or alternatively, in one or more embodiments of the invention, the task scheduler may perform the comparison runtime. For example, while the task scheduler is already currently scheduling tasks for one or more "existing" nodes, which may already be represented in an active nodes list that is accessible to the task scheduler, the task scheduler may receive an indication that a "new" node has been enabled or is otherwise newly available to receive tasks. The task scheduler may receive the connection address of the new node and may compare the connection address of the new node with the connection addresses of the existing nodes in order to determine whether or not there is a matching connection address.

Next, a determination may potentially be made, based at least in part on the comparison, that the connection address of the first or new node matches a connection address of a second node of the one or more additional or existing nodes, at block 227. For example, in one or more embodiments of the invention, the task scheduler may determine that the new node and one or more of the existing nodes may have the same SAS address. As one specific example, the task manager may determine that the new node is a SATA device that is connected to the same SATA port multiplier as an existing SATA device.

Then, tasks for at least the first and second nodes may be scheduled based, at least in part, on the determination, at block 228. In one or more embodiments of the invention, tasks for the first and second nodes, which have the same connection address, may be scheduled during a single common connection to the matching connection address. In one or more not necessarily different embodiments of the invention, tasks for the first and second nodes may be scheduled consecutively, rather than interleaving the scheduling of the tasks for the first and second nodes with tasks that are scheduled for a node with a different connection address.

In one or more embodiments of the invention, the tasks scheduler may maintain a task scheduling data structure that it may use to schedule tasks. In such embodiments of the invention, the task scheduler may modify the task scheduling data structure based, at least in part, on a comparison of connection addresses as described above.

Figure 3:
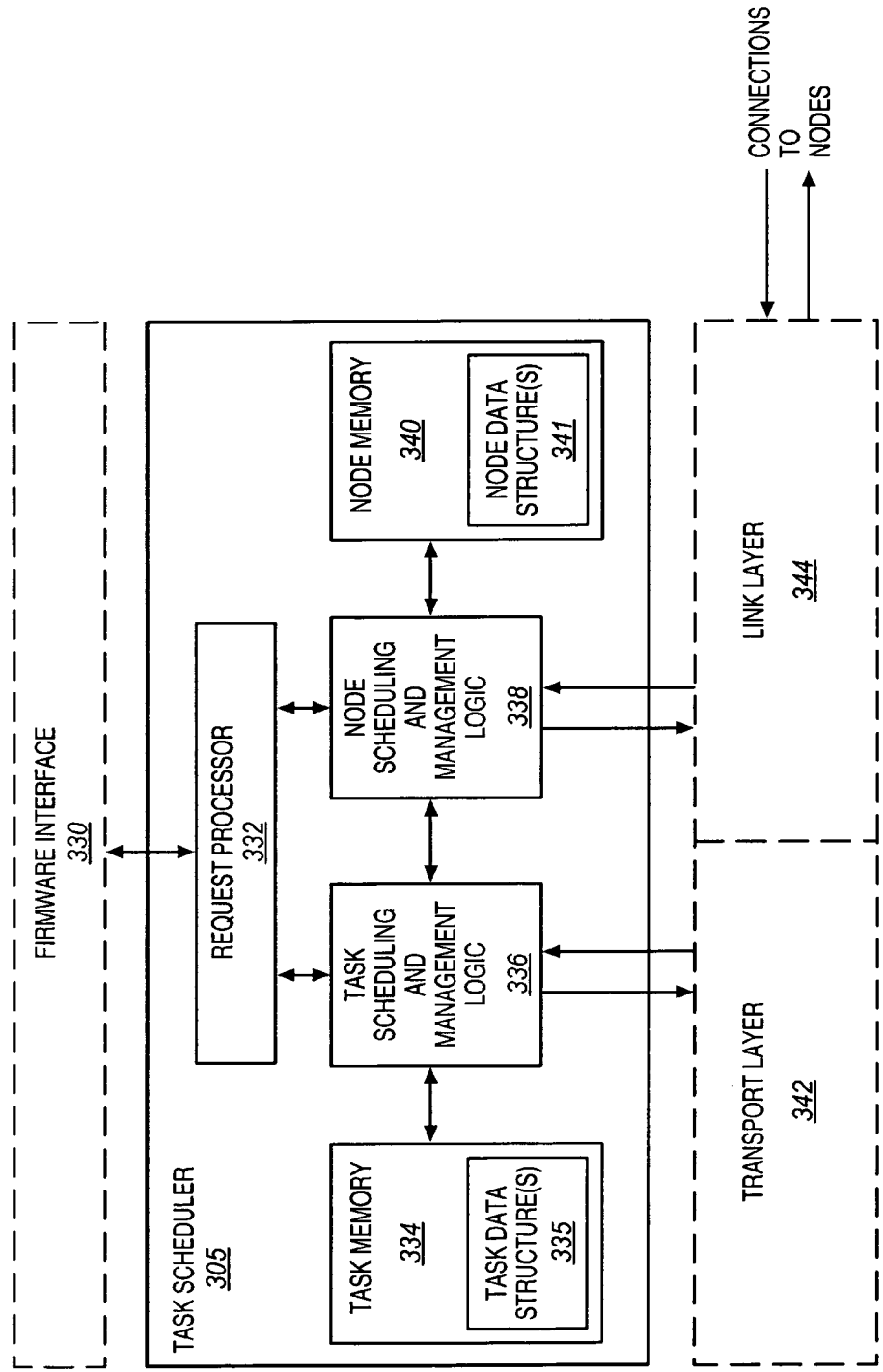
FIG. 3 is a block diagram of a task scheduler, according to one or more embodiments of the invention.

FIG. 3 is a block diagram of a task scheduler 305, according to one or more embodiments of the invention. Also shown, in dashed lines, to indicate how they may potentially interact with the task scheduler, but that they form no part of the present invention, are a firmware interface 330, transport layer 342, and link layer 344.

The task scheduler is logically or communicatively disposed between the firmware interface and the transport and link layers. The illustrated task scheduler includes a request processor 332, a task scheduling and management logic 336, a task memory 334, a node scheduling and management logic 338, and a node memory 340.

The request processor is coupled with, or otherwise in communication with the firmware interface, and individually coupled with, or otherwise in communication with, both the task scheduling and management logic and the node scheduling and management logic. The task scheduling and management logic is coupled with, or otherwise in communication with, the task memory. The node scheduling and management logic is coupled with, or otherwise in communication with, the node memory.

The request processor may receive node requests and task requests, such as, for example, from a firmware interface. Representatively, the firmware interface may interface with an operating system and applications via a command layer.

First, node requests will be discussed, and then task requests will be discussed further below. The request processor may communicate or otherwise provide the node requests to the node scheduling and management logic.

The node scheduling and management logic may receive the node requests. The node requests may include requests to add new nodes, such as, for example, when a node is newly enabled to receive tasks, and remove existing nodes, such as, for example, when a node is newly disabled.

In accordance with one or more embodiments of the invention, in response to a request to add a new node, the node scheduling and management logic may include logic to compare a connection address of the new node associated with the request with connection addresses of one or more additional or existing nodes, and to determine that the connection address of the new node matches a connection address of at least one node of the one or more additional or existing nodes.

In one or more embodiments of the invention, the node memory may store one or more node data structure(s) 341, such as, for example, the x-lists and y-lists discussed further below. The one or more node data structures may represent the one or more existing or additional nodes. The node scheduling and management logic may access the one or more node data structures in order to compare the connection address of the new node with one or more connection addresses of the one or more existing or additional nodes.

Then, the node scheduling and management logic may represent the new node in the one or more node data structures based, at least in part, on the determination that the connection address of the new node matches the connection address of the existing node. As will be explained further below, in one or more embodiments of the invention, the new node may be grouped with one or more existing nodes that have the same connection address.

The node scheduling and management logic may include logic to communicate and cooperate with the task scheduling and management logic to schedule tasks to the nodes based on the one or more node data structures. Additionally, the node scheduling and management logic may include logic to communicate with the link layer to request connections to the nodes.

Task requests will be discussed next. The request processor may communicate or otherwise provide the task requests to the task scheduling and management logic. The task scheduling and management logic may receive the task requests. The task requests may include requests to add new tasks, such as, for example, when the new task has been issued, and remove old tasks, such as, for example, when a old task has been reported to have been completed.

In one or more embodiments of the invention, the task memory may store one or more task data structure(s) 335, such as, for example, the y-lists discussed further below. The one or more task data structures may represent task lists, each including one or more tasks, for each of the nodes in the one or more node data structures described above.

The task scheduling and management logic may access the one or more task data structures and may add or remove tasks consistent with the task request. The task scheduling and management logic may also communicate and cooperate with the node scheduling and management logic to schedule tasks for nodes selected by the node scheduling and management logic. The task scheduling and management logic may include logic to communicate with the transport layer to request task execution.

Figure 4:
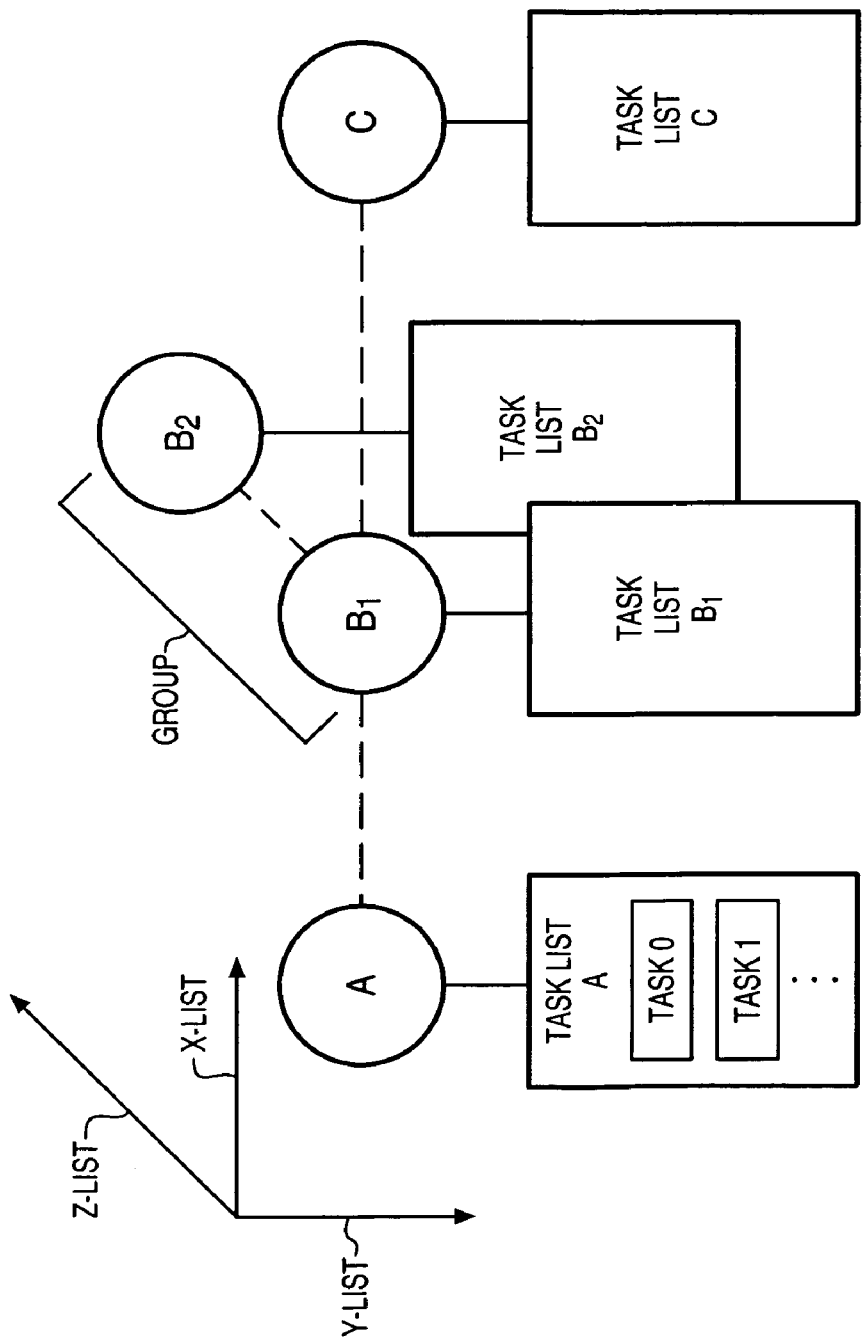
FIG. 4 conceptually illustrates a task scheduling data structure, according to one or more embodiments of the invention.

FIG. 4 conceptually illustrates a task scheduling data structure that the task scheduler may use to schedule tasks for nodes, according to one or more embodiments of the invention.

As shown, the task scheduling data structure may order or arrange nodes and task lists for the nodes. In particular, the task scheduling data structure may order or arrange the nodes in both an x-list and a z-list, and may order a task list of tasks for each of the nodes in a y-list. Often, the data structure may include pointers to order or arrange the nodes and tasks.

The x-list may include an ordered list, such as, for example, a circular linked list, of nodes that have different connection addresses. For example, in the illustrated embodiment, the x-list includes nodes A, B1, and C, which are each at a different position on the x-list, which are linked together, and which are ordered from left to right, respectively.

The z-list may an ordered list or group of nodes, such as, for example, a circular linked list, of nodes that have the same connection address and that each have the same connection address as a corresponding node with the same position on the x-list. For example, in the illustrated embodiment, the z-list includes node B2 linked or otherwise ordered relative to node B1, which has the same connection address. Since node B2 has the same connection address as node B1, node B2 is included at the same location on the x-list as node B1. However, node B2 is included at a different location on the z-list as node B1. In particular, node B2 is layered behind node B1 at the same location in the x-list but at a different location in the z-list.

The y-list may include an ordered list, such as, for example, a linked list, of tasks for each of the nodes in the x-list and z-list. For example, in the illustrated embodiment, the y-list includes task 0, task 1, and potentially other tasks, each at a different position on the y-list, for node A. Additional task lists are included for each of the other nodes in the x-list and z-list.

As shown, nodes with the same connection address may be grouped, linked, ordered, arranged, associated, or otherwise represented in the data structure in a different way than nodes with different connection addresses. For example, as shown, nodes with different connection addresses, such as, for example, A and B1, may be represented in an x-list, whereas nodes with the same connection address, such as, for example, B1 and B2, may be represented in a z-list. The z-list may be orthogonal to the x-list.

Using different ways to represent nodes with common and different connection addresses may allow the order in which nodes are traversed during task scheduling to be controlled. For example, in one or more embodiments of the invention, tasks may be scheduled for all of the nodes within a z-list, which has a given position on the x-list, before scheduling tasks for a node with a different position on the x-list. That is, tasks may be scheduled for all of the nodes with the same connection address before scheduling tasks for nodes with different connection addresses. At least conceptually, the nodes of the z-list may be considered as nested within adjoining nodes of the x-list. The tasks for the nodes with the common connection addresses may optionally be scheduled within the same connection to the connection address.

FIG. 5A shows a specific example of a task scheduling data structure, according to one or more embodiments of the invention. The data structure includes node elements for nodes A, B1, B2, and C, in which only nodes B1 and B2 have the same connection address, and task elements for each of the nodes.

FIG. 5B shows exemplary information for a node element, according to one or more embodiments of the invention. As shown, the information may include x-list pointers, y-list pointers, z-list pointers, and node parameters. The x-list pointers may include previous and next pointers linked to form a circularly linked x-list, which may include nodes with different connection addresses. The y-list pointers may include head and tail pointers to the task list corresponding to this particular node. Optional subdivision into multiple lists, such as, for example, higher and lower priority tasks, may be employed, if desired. The z-list pointers may include previous and next pointers linked to form a circularly linked z-list, which may include nodes with the same connection address. Exemplary node parameters may include, but are not limited to, remote node index, connection addresses, device queue depth, outstanding task count, remote node port width, and the like.

FIG. 5C shows an exemplary information for a task element, according to one or more embodiments of the invention. As shown, the information may include task pointers and task parameters. The task pointers may include previous and next pointers that may be linked to form a circularly linked y-list, which may include a set of active tasks for a specific corresponding node. Exemplary task parameters may include, but are not limited to, task type, task context index, transport layer retry control, remote node index, protocol control, task control word, task expiration time, and the like.

Figure 6:
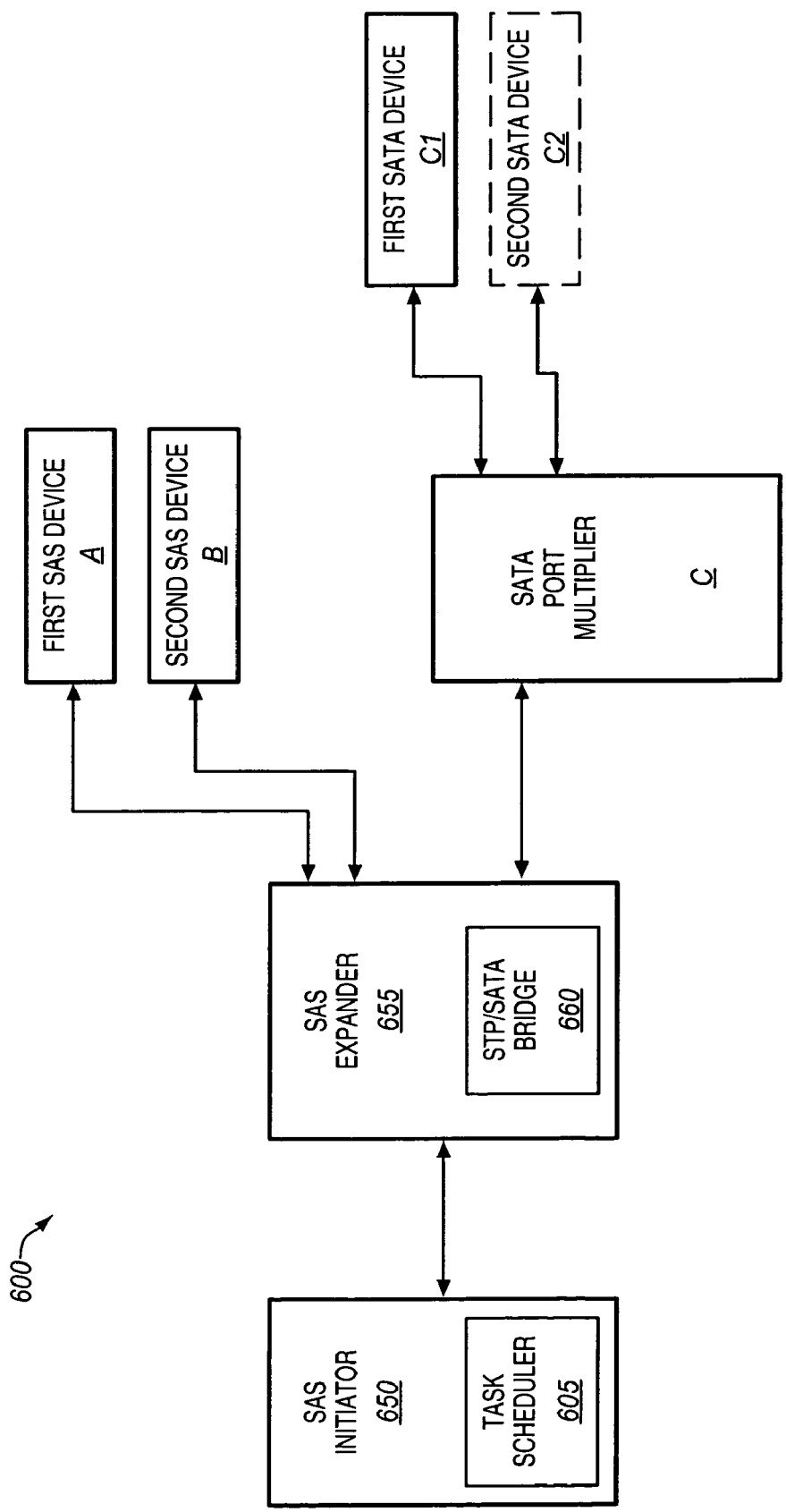
FIG. 6 is a block diagram of a first SAS-based computer systems architecture in which one or more embodiments of the invention may be implemented.

FIG. 6 is a block diagram of a first SAS-based computer systems architecture 600 in which one or more embodiments of the invention may be implemented. The illustrated architecture includes an SAS initiator 650, an SAS expander 655, a first SAS device (A), a second SAS device (B), a SATA port multiplier C, a first SATA device (C1), and a second SATA device (C2).

The SAS expander is coupled with, or otherwise in communication with, the SAS initiator. The first and second SAS devices are coupled with, or otherwise in communication with, the SAS expander by a first and second SAS links or other communication paths, respectively. The SATA port multiplier is coupled with, or otherwise in communication with, the SAS expander by a link or communication path to a STP/SATA bridge 660 of the SAS expander. The first and second SATA devices are coupled with, or otherwise in communication with, the SATA port multiplier by a first and second SATA links respectively. Suitable SATA devices include, but are not limited to, hard drives, magnetic hard drives, pluralities of hard drives, arrays of hard drives, redundant arrays of inexpensive disks boxes, CD-ROM devices, tape drives, Zip drives, SuperDisk drives, and the like.

The first and second SAS devices have different SAS connection addresses. In contrast, the first and second SATA devices have the same or matching SAS connection address. That is, each of the SATA devices may be accessed by connection through the address of the STP/SATA bridge.

In the illustrated embodiment, the SAS initiator includes a task scheduler 605. However, the task scheduler may also, or alternatively, be included in the SAS expander, or elsewhere in the architecture. Task schedulers may also optionally be included in a target device, such as, for example, an SAS device and/or SATA device.

The task scheduler may schedule tasks for the SAS and SATA devices. Representative tasks, for such architecture, may include, but are not limited to, new commands, XFER_RDY frames, data, data sequence, response frames, primitives, and like signals.

According to one or more embodiments of the invention, the task scheduler may treat each of the SAS devices and each of the SATA devices as a separate node having a separate task list. Since the SATA devices have a common connection address, the order in which the SAS devices and SATA devices are traversed during task scheduling may affect performance. For example, if the task scheduling of the SATA devices is interleaved with the task scheduling of one or more of the SAS devices, then unnecessary closures and re-openings of connections may result. In some cases, one or more of the SATA devices may be hot plugged into the SATA port multiplier, which may tend to promote such interleaving.

However, according to one or more embodiments of the invention, the task scheduler may compare a connection address of one SATA device, such as, for example, the second SATA device (C2), with a connection address of another SATA device, such as, for example, the first SATA device (C1), may determine that both of the SATA devices have the same connection address, and may schedule tasks to the SATA devices based, at least in part, on this determination that the connection addresses match. In one aspect, the task scheduler may schedule tasks for the SATA devices consecutively, rather than interleaving the tasks with a task for a device having a different connection address. In another aspect, the task scheduler may schedule tasks for the SATA devices within a single common connection to the STP/SATA bridge and/or the SATA port multiplier.

In one or more embodiments of the invention, the task scheduler may perform such operations during an initial setup, before the task scheduler has scheduled tasks for the devices. In one or more not necessarily different embodiments of the invention, the operations may be performed runtime, after the task scheduler has already been scheduling tasks for one or more existing devices. As one example, the operations may be performed when, in response to, or otherwise after, a device, such as, for example, the second SATA device, is hot plugged, or otherwise becomes newly available to receive tasks.

Figure 7:
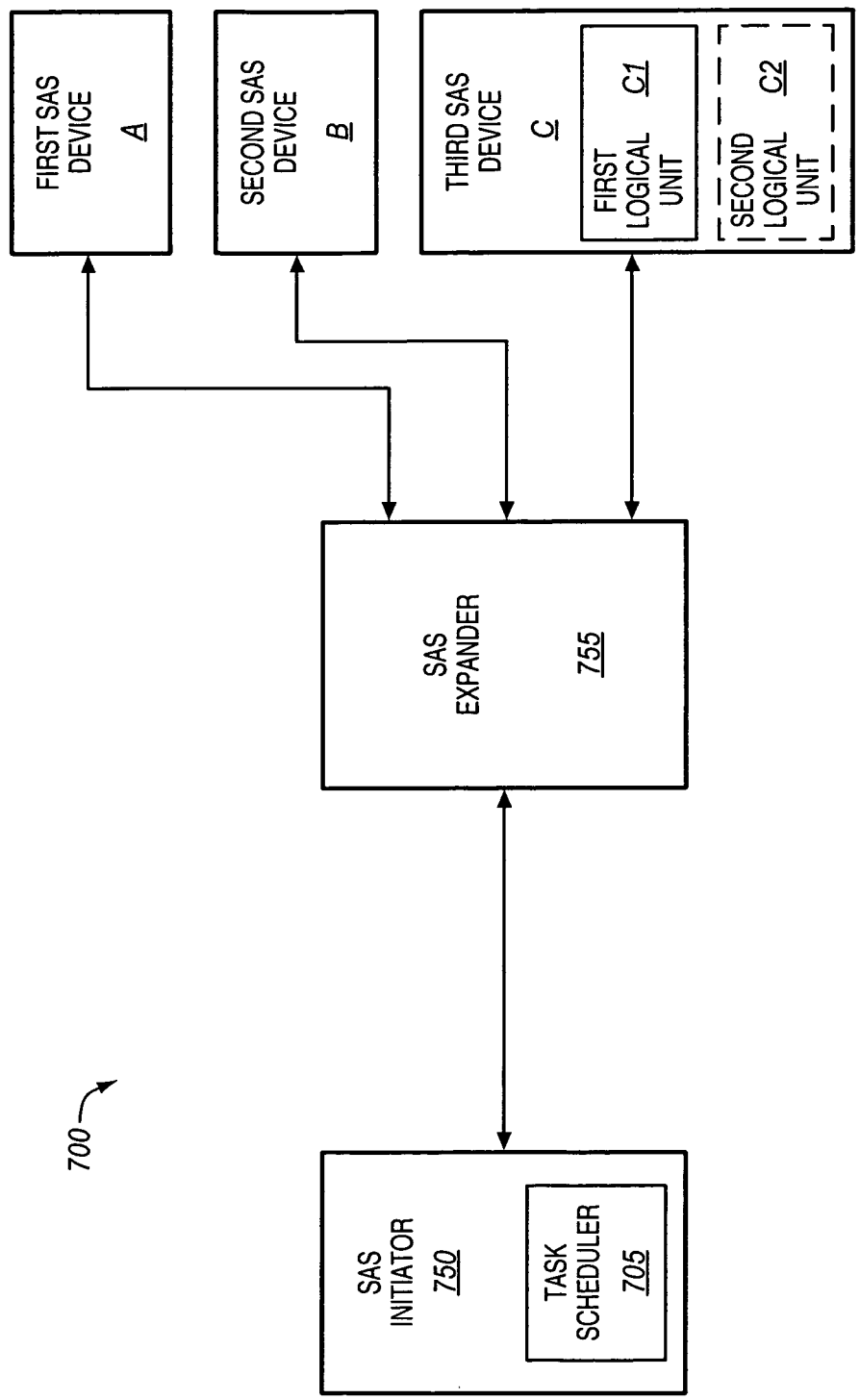
FIG. 7 is a block diagram of a second SAS-based computer systems architecture in which one or more embodiments of the invention may be implemented.

FIG. 7 is a block diagram of a second SAS-based computer systems architecture 700 in which one or more embodiments of the invention may be implemented. The illustrated architecture includes an SAS initiator 750, an SAS expander 755, a first SAS device (A), a second SAS device (B), and a third SAS device (C). The third SAS device includes a first logical unit (C1), and a second logical unit (C2).

The first, second, and third SAS devices each have different SAS connection addresses. However, the logical units (C1, C2) of the third SAS device have the same or matching SAS connection address. That is, each of the logical units may be accessed by connecting to the SAS address of the third SAS device.

In the illustrated embodiment, the SAS initiator includes a task scheduler 705, although, as previously described, the task scheduler may optionally be located elsewhere in the architecture.

According to one or more embodiments of the invention, each of the first and second SAS devices may be treated as a separate node with a separate task list, and each of the logical units (C1, C2) may be treated as a separate node with a separate task list.

Since the logical units have a common connection address, the order in which the nodes are traversed during task scheduling may affect performance.

For example, if the task scheduling of the logical units is interleaved with the task scheduling of one or more of the first and second SAS devices, then unnecessary closures and re-openings of connections to the third SAS device may result. In some cases, one or more of the logical units may become newly enabled, such as, for example, by management software used for the third SAS device, which may tend to promote such interleaving. Enabling and disabling the logical units may potentially alter or vary the order in which the nodes are traversed during task scheduling.

However, according to one or more embodiments of the invention, the task scheduler may compare a connection address of one logical unit, such as, for example, the second logical unit (C2), with a connection address of another logical unit, such as, for example, the first logical unit (C1), may determine that both of the logical units have the same connection address, and may schedule tasks to the logical units based, at least in part, on this determination that the connection addresses match. In one aspect, the task scheduler may schedule tasks for the logical units consecutively, rather than interleaving the tasks with a task for a device having a different connection address. In another aspect, the task scheduler may schedule tasks for the logical units within a single common connection to the third SAS device.

The task scheduler may perform such operations at runtime, during initial setup, or at both times. In one aspect, the task scheduler may perform such operations runtime when a logical unit is newly enabled or otherwise newly available to receive tasks.

A similar approach to that described above for logical units may also be readily adapted for volume storage.

Figure 8:
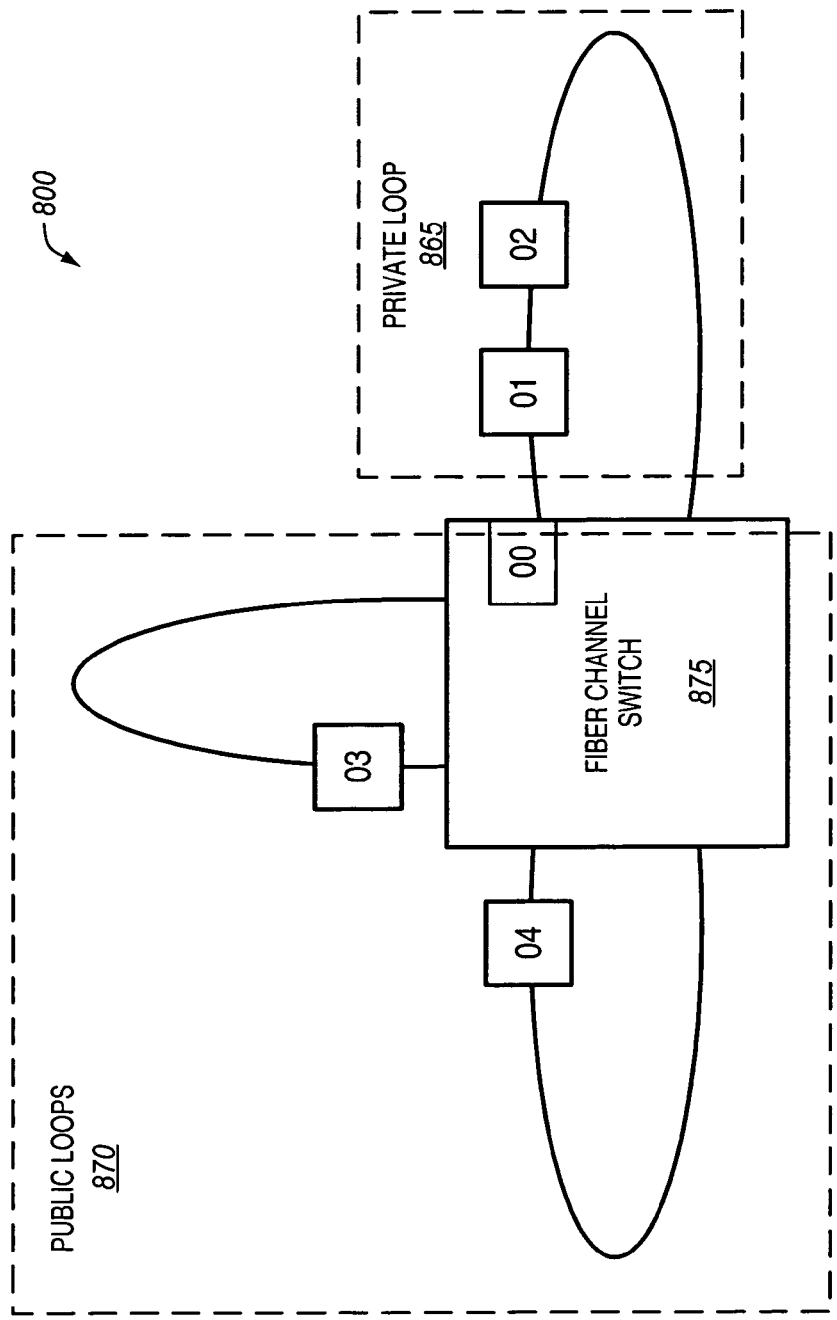
FIG. 8 is a block diagram of a fibre channel computer systems architecture in which one or more embodiments of the invention may be implemented.

FIG. 8 is a block diagram of a fibre channel computer systems architecture 800 in which one or more embodiments of the invention may be implemented. The illustrated architecture includes a private loop 865 and a public loops 870.

The private loop includes a first plurality of devices 01, 02. The public loops includes a plurality of loops having second plurality of devices 03, 04.

Each device on the private loop may access other devices on the private loop directly using different connection addresses. However, each device on the private loop may access all of the devices on the public loops through a common or matching connection through a fibre channel switch 875 and port 00.

That is, for a given private loop device, all of the public loops devices have the same or matching connection address through the fibre channel switch and through the port 00. The fibre channel switch and the port 00 represent exemplary connection addresses for the fibre channel architecture.

In one or more embodiments of the invention, one or more, or all, of the devices on the private loop may include a task scheduler. However, the task scheduler may also, or alternatively, be located elsewhere in the architecture.

According to one or more embodiments of the invention, each of the devices of the private loop may be treated as a separate node with a separate task list, and each of the devices of the public loops may be treated as a separate node with a separate task list.

Since the devices of the public loops all have a common connection address, the order in which the nodes are traversed during task scheduling may affect performance. For example, if the task scheduling of the devices of the public loops is interleaved with the task scheduling of one or more of the devices of the private loop, then unnecessary closures and re-openings of connections to the fibre channel switch and port 00 may result.

However, according to one or more embodiments of the invention, a task scheduler may compare a connection address of one device of the public loops, such as, for example, device 03, with a connection address of another device of the public loops, such as, for example, device 04, may determine that both of the devices on the public loops have the same connection address, and may schedule tasks to the devices on the public loops based, at least in part, on this determination that the connection addresses match. In one aspect, the task scheduler may schedule tasks for the devices on the public loops consecutively, rather than interleaving the tasks with a task for a device on the private loop that has a different connection address. In another aspect, the task scheduler may schedule tasks for the devices on the public loops within a single common connection to the fibre channel switch and port 00.

The task scheduler may perform such operations at runtime, during initial setup, or at both times. In one aspect, the task scheduler may perform such operations runtime when devices are newly enabled on the private and/or public loops.

Now, representative embodiments of the invention have been illustrated for several exemplary architectures, although the scope of the invention is not limited to just these particular architectures. Other embodiments will be apparent to those skilled in the art and having the benefit of the present disclosure.

Figure 9:
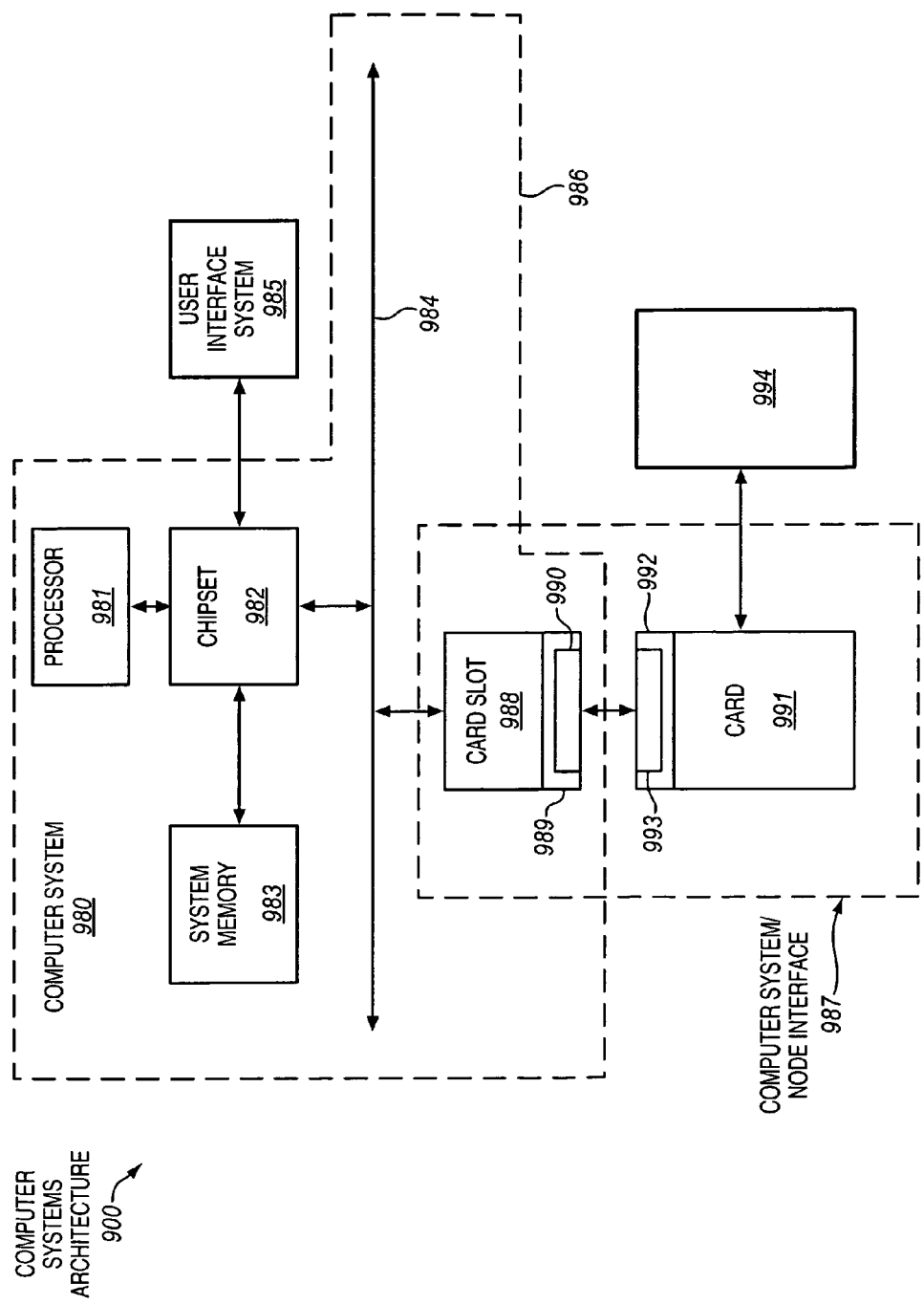
FIG. 9 is a block diagram of a computer systems architecture in which one or more embodiments of the invention may be implemented.

FIG. 9 is a block diagram showing a computer architecture 900 in which one or more embodiments of the invention may be implemented. The architecture includes a computer system 980, a user interface system 985, a plurality of storage devices or other nodes 994, and a computer system/node interface 987 to allow the computer system and nodes to interact.

As used herein, a "computer system" may include an apparatus having hardware and/or software to process data. The computer system may include, but is not limited to, a portable, laptop, desktop, server, or mainframe computer, to name just a few examples. The computer system represents one possible computer system for implementing one or more embodiments of the invention, however other computer systems and variations of the computer system are also possible.

The computer system includes a processor 981 to process information. In one or more embodiments, the processor may include a processor in the Pentium® family of processors, such as, for example, a Pentium® 4 processor. The Pentium® family of processors are commercially available from Intel Corporation, of Santa Clara, Calif. Alternatively, other processors may optionally be used. As one example, a processor having multiple processing cores may be used. As another example, a processor manufactured and/or commercially available from a source other than Intel Corporation may optionally be used. Further, in one or more embodiments, the computer system may include multiple processors.

The processor is coupled with a chipset 982 by an interface. A system memory 983, a user interface system 985, and one or more input/output (I/O) buses or other interconnects 984, are each additionally coupled with, or otherwise in communication with the chipset by respective interfaces.

In one or more embodiments of the invention, the chipset may include one or more integrated circuits or other microelectronic devices, such as, for example, those that are commercially available from Intel Corporation. However, other microelectronic devices may also, or alternatively, be used.

In one or more embodiments of the invention, the chipset may include a first bridge/hub (not shown), such as, for example, a memory control bridge/hub available from Intel Corporation, and a second bridge/hub (not shown), such as, for example, an input/output (I/O bridge/hub available from Intel Corporation. In one or more other embodiments, at least a portion of the memory control bride/hub, such as, for example, the memory controller, may be in the same chip as the processor. The first bridge/hub may be coupled with the second bridge/hub by a hub interface. However, the scope of the invention is not limited to such chipsets.

The system memory may be coupled with, or in communication with, the memory control bridge/hub. In one or more embodiments of the invention, the system memory may include a main memory, such as, for example, a random access memory (RAM) or other dynamic storage device, to store information including instructions to be executed by the processor. Different types of RAM memory that are included in some, but not all computer systems, include, but are not limited to, static-RAM (SRAM) and dynamic-RAM (DRAM). Other types of RAM that are not necessarily dynamic or need to be refreshed may also optionally be used. Additionally, in one or more embodiments of the invention, the system memory may include a read only memory (ROM) to store static information and instructions for the processor, such as, for example, the basic input-output system (BIOS). Different types of memory that are included in some, but not all, computer systems include Flash memory, programmable ROM (PROM), erasable-and-programmable ROM (EPROM), and electrically-erasable-and-programmable ROM (EEPROM).

The one or more I/O interconnects and the user interface system may be coupled with, or otherwise in communication with, the I/O bridge/hub. Suitable I/O interconnects include, but are not limited to, peripheral component interconnect (PCI) family buses, accelerated graphics port (AGP) buses, universal serial bus (USB) buses, low pin count (LPC) buses, other kinds of I/O buses, or combinations thereof. In one particular embodiment of the invention, the one or more I/O interconnects may include a PCI, PCIX (PCI extended), and/or PCI-Express (PCI-E) interconnect. The chipset and the I/O bridge/hub may accordingly support standard I/O operations on one or more of such I/O interconnects.

The user interface system may representatively include devices, such as, for example, a display device, a keyboard, a cursor control device, and combinations thereof, although the scope of the invention is not limited in this respect. For example, some computer systems, such as servers, may optionally employ simplified user interface systems.

As shown in the illustrated embodiment, a computer system/node interface 987 may be coupled with the one or more I/O interconnects, such as, for example, the PCI/PCI-X bus. The one or more interconnects may be used to communicate information among components.

The illustrated computer system/node interface includes a card slot 988 and a card 991, such as, for example, a PCI compliant card, although the scope of the invention is not limited in this respect. The card slot is coupled with, or otherwise in communication with, the one or more I/O interconnects. The slot and the card may be constructed to permit the card to be inserted into the slot and electrically coupled with the card slot to allow the card to be coupled with, or otherwise in communication with, the one or more I/O interconnects. For example, an interface 989 of the card slot may include a bus or other interconnect connector 990 that may be electrically and mechanically mated with a mating bus or other interconnect connector 993 that may be included in an expansion slot or interface 992 of the card. When the card is properly inserted into the slot, the mating connectors may become mechanically and/or electrically coupled with each other. When the connectors are so coupled with each other, the card may become electrically coupled with the one or more I/O interconnects and may exchange data and/or commands with the system memory, the host processor, and/or other components of the computer system.

The card may include computer system/node interface bridge logic, such as typically included in an host bus adapter (HBA) for SAS or SATA, in order to allow the computer system and the nodes to communicate with and/or access one another. In addition, in one or more embodiments of the invention, the card may include a task scheduler as disclosed herein.

The nodes may be coupled with the storage device interface, for example the card, via separate communication paths. Some communication paths may go through the same connection address and other communication paths may go through different connection addresses.

The computer system may exchange data and/or commands with the nodes via the card. Various communication protocols including, but not limited to, those of SAS, SAS-STP, SATA, may optionally be used.

Now, as shown in the illustrated embodiment, the processor, system memory, chipset, one or more I/O interconnects, and card slot may optionally be included on or otherwise connected to a single circuit board 986, such as, for example, a motherboard or backplane. The motherboard and the components connected thereto are often housed within a chassis or primary housing of the computer system. Components of the user interface system and the storage device may, in one or more embodiments, be outside of the chassis or primarily housing. The slot may represent an opening into the chassis or housing into which the card may be inserted.

However, this particular configuration is not required. Numerous alternate computer system architecture embodiments are also contemplated. For example, in various alternate embodiments of the invention, the computer system/node interface, or at least task scheduling logic thereof, may be either entirely internal or external to the chassis or housing of the computer system. For example, the task scheduling logic may be included on the motherboard. As another example, in one or more alternate embodiments of the invention, task scheduling logic may also or alternatively be included in the chipset. Many additional modifications are contemplated.

In the description and claims, the terms "coupled" and "connected," along with their derivatives, may be used. It should be understood that these terms are not intended as synonyms for each other. Rather, in particular embodiments, "connected" may be used to indicate that two or more components are in direct physical or electrical contact with each other. "Coupled" may mean that two or more components are in direct physical or electrical contact. However, "coupled" may also mean that two or more components are not in direct contact with each other, but yet still co-operate or interact with each other. For example, two or more components may be coupled with one another via one or more intervening components. In addition, two or more components may be in communication with one another if they exchange data or information, regardless of whether they are in direct contact or not.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description.

Various operations and methods have been described. Some of the methods have been described in a basic form, but operations may optionally be added to and/or removed from the methods. The operations of the methods may also often optionally be performed in different order. Many modifications and adaptations may be made to the methods and are contemplated.

As used herein, the term "logic" may include hardware, such as, for example, circuitry, software, firmware, and combinations thereof. Operations may be performed by hardware components, or may be embodied in machine-executable instructions, that may be used to cause, or at least result in, a circuit programmed with the instructions performing the operations. The circuit may include a general-purpose or special-purpose processor, or logic circuit, to name just a few examples. The operations may also optionally be performed by a combination of hardware and software. The task scheduling operations described herein tend to be well suited for offloading task scheduling from firmware to hardware, although the scope of the invention is not limited in this respect.

One or more embodiments of the invention may be provided as a program product or other article of manufacture that may include a machine-accessible and/or readable medium having stored thereon one or more instructions and/or data structures. The medium may provide instructions, which, if executed by a machine, may result in and/or cause the machine to perform one or more of the operations or methods disclosed herein. Suitable machines include, but are not limited to, computer systems, network devices, and a wide variety of other devices with one or more processors, to name just a few examples.

The medium may include, a mechanism that provides, for example stores and/or transmits, information in a form that is accessible by the machine. For example, the medium may optionally include recordable and/or non-recordable mediums, such as, for example, floppy diskette, optical storage medium, optical disk, CD-ROM, magnetic disk, magneto-optical disk, read only memory (ROM), programmable ROM (PROM), erasable-and-programmable ROM (EPROM), electrically-erasable-and-programmable ROM (EEPROM), random access memory (RAM), static-RAM (SRAM), dynamic-RAM (DRAM), Flash memory, and combinations thereof.

A medium may also optionally include an electrical, optical, acoustical, radiofrequency, or other form of propagated signal, such as carrier waves, infrared signals, digital signals, for example. One or more embodiments of the invention may be downloaded as a computer program product, wherein the program may be transferred from one machine to another machine by way of data signals embodied in a carrier wave or other propagation signal or medium via a communication link (e.g., a modem or network connection).

For clarity, in the claims, any element that does not explicitly state "means for" performing a specified function, or "step for" performing a specified function, is not to be interpreted as a "means" or "step" clause as specified in 35 U.S.C. Section 112, Paragraph 6. In particular, any potential use of "step of" in the claims herein is not intended to invoke the provisions of 35 U.S.C. Section 112, Paragraph 6.

It should also be appreciated that reference throughout this specification to "one embodiment", "an embodiment", or "one or more embodiments", for example, means that a particular feature may be included in the practice of the invention. Such recitations do not necessarily refer to the same embodiment. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

Accordingly, while the invention has been thoroughly described in terms of several embodiments, those skilled in the art will recognize that the invention is not limited to the particular embodiments described, but may be practiced with modification and alteration within the spirit and scope of the appended claims. The description is thus to be regarded as illustrative instead of limiting.

What is claimed is:

1. A method comprising: with circuitry of a task scheduler:
   generating a schedule for a sequence of tasks, the schedule for cycling through a plurality of nodes including a first node, a second node and one or more other nodes, the first node and the second node each coupled to the task scheduler via a first communication path including a port expander, the one or more other nodes coupled to the task scheduler independent of the port expander, the port expander for the task scheduler to communicate through a single port with nodes having a first connection address, the scheduling including:
      comparing connection address information for the first node with connection address information for the second node;
      based on the comparing, determining that the first node and the second node share the first connection address; and
      in response to the determining, grouping the first node with the second node in the sequence of tasks;
   wherein an execution of the sequence of tasks according to the schedule is to include:
      opening a first connection for communication via the first communication path, wherein based on the grouping the first node with the second node, the first connection to remain open for both a scheduled task for the first node and a scheduled task for the second node;
      opening a second connection for communication independent of the port expander, the second connection for a task of the one or more other nodes; and
      after one of the opening the first connection and the opening the second connection, closing the open one of the first connection and the second connection in preparation for cycling to the other of the opening the first connection and the opening the second connection.

2. The method of claim 1, wherein generating the schedule includes updating a task scheduling data structure having:
   a first linked list of nodes including the first node and the second node;
   a second linked list of node tasks; and
   a third linked list of nodes sharing a common connection address.

3. The method of claim 2, wherein grouping the first node with the second node includes adding a representation of the first node in the third linked list when the second node is already represented in the third linked list.

4. The method of claim 1, wherein the connection addresses of the first and second nodes comprise matching SAS connection addresses.

5. The method of claim 1, wherein the connection addresses of the first and second nodes comprise matching addresses to a switch on a public fibre channel loop that is addressed by a device on a private fibre channel loop.

6. An apparatus comprising:
   node scheduling circuitry including comparison circuitry to compare connection address information for a first node with connection address information for a second node, and to determine based on the comparing that the first node and the second node share a first connection address; and
   task scheduling circuitry in communication with the comparison circuitry to generate a schedule for a sequence of tasks, the schedule for cycling through a plurality of nodes including the first node, the second node and one or more other nodes, to couple to both the first node and the second node via a first communication path including a port expander, and to couple to one or more other nodes independent of the port expander, the port expander for the apparatus to communicate through a single port with nodes having the first connection address, wherein in response to the determining, the task scheduling circuitry further to group the first node with the second node in the sequence of tasks;
   wherein an execution of the sequence of tasks according to the schedule is to include:
      opening a first connection for communication via the first communication path, wherein based on the first node being grouped with the second node, the first connection to remain open for both a scheduled task for the first node and a scheduled task for the second node;
      opening a second connection for communication independent of the port expander, the second connection for a task of the one or more other nodes; and
      after one of the opening the first connection and the opening the second connection, closing the open one of the first connection and the second connection in preparation for cycling to the other of the opening the first connection and the opening the second connection.

7. The apparatus of claim 6, wherein the task scheduling circuitry to generate the schedule includes the task scheduling circuitry to update a task scheduling data structure having:
- a first linked list of nodes including the first node and the second node;
- a second linked list of node tasks; and
- a third linked list of nodes sharing a common connection address.

8. A system comprising:
- a DRAM memory to store software; and
- a task scheduler in communication with the DRAM memory to receive tasks associated with the software, the task scheduler including:
    - node scheduling logic including comparison logic to compare connection address information for a first node with connection address information for a second node, and to determine based on the comparing that the first node and the second node share a first connection address; and
    - task scheduling logic in communication with the comparison logic to generate a schedule for a sequence of tasks, the schedule for cycling through a plurality of nodes including the first node, the second node and one or more other nodes, to couple to both the first node and the second node via a first communication path including a port expander, and to couple to one or more other nodes independent of the port expander, the port expander for the task scheduler to communicate through a single port with nodes having the first connection address, wherein in response to the determining, the task scheduling logic further to group the first node with the second node in the sequence of tasks;
- wherein an execution of the sequence of tasks according to the schedule is to include:
    - opening a first connection for communication via the first communication path, wherein based on the first node being grouped with the second node, the first connection to remain open for both a scheduled task for the first node and a scheduled task for the second node;
    - opening a second connection for communication independent of the port expander, the second connection for a task of the one or more other nodes; and
    - after one of the opening the first connection and the opening the second connection, closing the open one of the first connection and the second connection in preparation for cycling to the other of the opening the first connection and the opening the second connection.

9. The system of claim 8:
- wherein the node scheduling logic and the task scheduling logic each include circuitry; and
- wherein the task scheduling logic resides in a card that is inserted into a card slot of the system.

10. The system of claim 8:
- wherein the node scheduling logic and the task scheduling logic each include circuitry; and
- wherein the task scheduling logic resides on a circuit within a primary housing of the system.

11. The system of claim 8, wherein the task scheduling logic to generate the schedule includes the task scheduling logic to update a task scheduling data structure having:
- a first linked list of nodes including the first node and the second node;
- a second linked list of node tasks; and
- a third linked list of nodes sharing a common connection address.

* * * * *